United States Patent

[11] 3,592,280

[] Inventors Joachim Wappler
 11 Clayhill Crescent, Downsview, Ontario;
 Arno C. Schwarz, 55 Oakmount Road, Apt.
 1503, Toronto 5, Ontario, both of, Canada
[ ] Appl. No. 746,719
[ ] Filed June 10, 1968
[ ] Patented July 13, 1971

[ ] VARIABLE-SPEED DRIVE AND COMBINED BRAKING AND STEERING MECHANISM
8 Claims, 11 Drawing Figs.

[2] U.S. Cl. .................................................. 180/6.2
[1] Int. Cl. .................................................. B62d 11/08
[0] Field of Search .......................................... 180/6.2, 6.48, 6.66, 77, 77 H

[6] References Cited
UNITED STATES PATENTS

| | | | |
|---|---|---|---|
| 052,311 | 9/1962 | Leedom | 180/6.66 |
| 180,305 | 4/1965 | Gower-Rempel | 180/6.48 |
| 3,190,385 | 6/1965 | Allport | 180/77 H |
| 3,204,713 | 9/1965 | Shanahan et al. | 180/6.48 |

FOREIGN PATENTS

| 493,078 | 5/1953 | Canada | 180/6.2 |
|---|---|---|---|

Primary Examiner—Benjamin Hersh
Assistant Examiner—John A. Pekar
Attorney—George A. Rolston This application filed under Rule 47.

ABSTRACT: A selective vehicle wheel speed control system for a motor-driven vehicle with wheels having a separate side drive train system for driving the wheels on each side, a steering and braking means in each drive train system for braking the wheels on each side which is operated in unison for braking and separately for steering the vehicle, and a transmission means with a means for engaging and disengaging the transmission means in each side drive train system to transmit the power to the wheels operated simultaneously with the braking and steering means.

PATENTED JUL 13 1971 3,592,280

INVENTORS
JOACHIM WAPPLER
ARNO C. SCHWARZ
BY George A. Rolston

INVENTORS
JOACHIM WAPPLER
ARNO C. SCHWARZ
BY George A. Rolston

PATENTED JUL 13 1971 3,592,280

INVENTORS
JOACHIM WAPPLER
ARNO C. SCHWARZ
BY George A. Rolston

VARIABLE-SPEED DRIVE AND COMBINED BRAKING AND STEERING MECHANISM

This invention relates to a vehicle of the type capable of propelling itself over land of any type and water, and in particular to the drive means for such a vehicle used with a control system for braking, steering, throttling and effecting the variations in the power transmitted to the wheels of the vehicle and the speed of rotation of the wheels.

One example of this type of vehicle has a transmission which is associated with chains and sprockets to drive the wheels of the vehicle. As is well known the alignment of the sprockets is critical to ensure that the chains run satisfactorily and such critical alignment involves substantial additional manufacturing costs. In addition, with this type of vehicle using low-pressure tires, the diameter of the tires is entirely dependent upon the pressure and even minor variations will produce major changes in diameter. As a result, the wheels will try to run at different speeds and this has been a major cause of difficulty with chain drives in the past. Furthermore in such prior vehicles a separate braking system was required and the power transmission incorporated two clutches which had to be declutched simultaneously on both sides at once for stopping.

It is an object of this invention to provide a lightweight drive means which is simple to assemble for use with a vehicle.

It is another object of this invention to provide such a drive means which is constructed so as to permit it to drive and/or brake the wheels on one side or the other selectively or both together.

This invention provides a drive means which has a belt and pulley mechanism to transmit the power from an engine to the wheels. The belt and pulley mechanism is simple to assemble with relatively sloppy tolerances permitted.

The invention further provides, with a single braking system, both braking and steering, the brakes being operated either together or selectively by the same brake control means, and eliminates the need for clutches by employing slipping belts. Thus the operator controls the maneuvering of the vehicle by using only one hand on the control stick.

The foregoing and other advantages will become apparent from the following description of a preferred embodiment of the invention which is here given by way of example only with reference to the following drawings in which like reference devices refer to like parts thereof through various views and diagrams, and in which.

Figure 1:
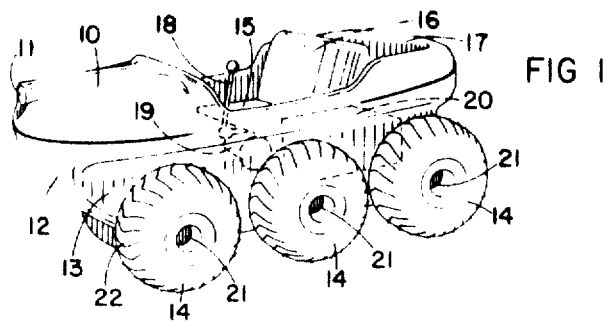
FIG. 1 is a perspective view of the vehicle embodying the invention.

FIG. 1 illustrates a vehicle embodying the invention, it will be seen that the vehicle has body 10 with a headlight 11 and an undercarriage 12 having channels 13 on either side thereof in which wheels 14 are positioned. Preferably three wheels 14 are rotatably associated with the body 10 on each side thereof. The body 10 may be made of any suitable light strong material preferably fiberglass. In the body 10 is provided a seat 15 for the operator with a back 16 and a deck 17. A control stick 18 is provided for the operator to steer and brake the vehicle. An internal combustion engine 19 and a drive means 20 are housed in the body 10 being shown in dotted lines located under the seat 15. Wheels 14 are mounted on axles 21 and are provided with raised lugs 22 which assist in providing a grip between the wheels 14 and the land over which the vehicle is travelling. There is no type of suspension system provided as the need for such a system is removed by employing wheels 14 which are of the low-pressure type.

Figure 2:
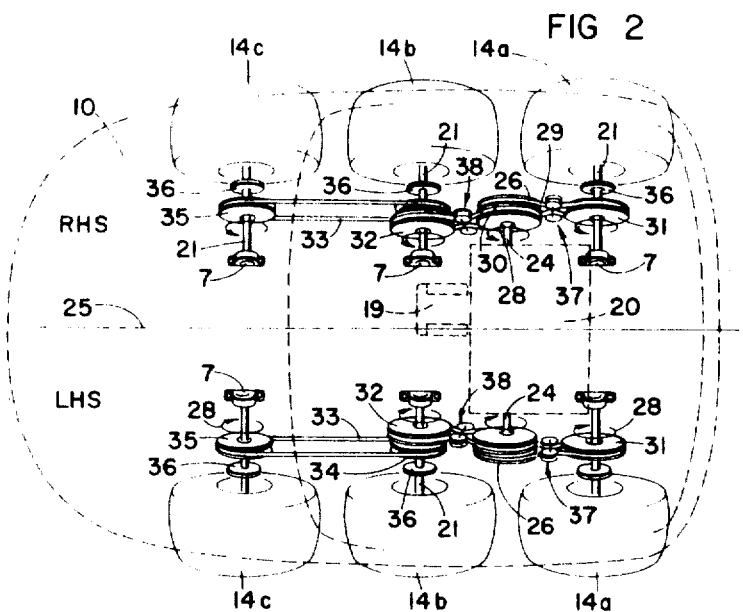
FIG. 2 is a plan view of the vehicle shown in FIG. 1 illustrating how the driving mechanism is connected between the drive means and the wheels.

FIG. 2 is a plan view of the vehicle showing the body 10 in dotted lines so as to illustrate better the driving mechanism connected to the drive means 20 for driving the wheels 14 on opposite sides of the vehicle independently of each other. The driving mechanism is shown as being symmetrical on each side along a longitudinal axis 25 and being such, only one side will be described. The engine 19 and the drive means 20 are shown in dotted lines. The mounting shaft 24 of the drive means 20 are shown extending symmetrically therefrom on opposite sides of the longitudinal axis 25 and each has rotatably secured thereon a driving pulley 26 and a sprocket 27, shown in FIG. 3, which are rotated in a direction shown by the arrow 28 when the operator desires the vehicle to move forward. By means of belts 29 and 30 associated with the driving pulley 26 rear wheels 14a and mid wheels 14b rotate in the direction shown by the arrow 28. Belt 29 engages the driving pulley 26 and a rear wheel pulley 31 and belt 30 engages the driving pulley 26 and the midwheel pulley 32 whereby power is independently transmitted from the drive means 20 to each wheel. Belt 33 extends between the auxiliary pulley 34 secured on the midwheel axle 21 and a front wheelpulley 35 to transmit power to the front wheels 14a. The axles 21 of the wheels 14 extend out of the undercarriage 12 of the vehicle and require a watertight seal 36 on each axle to prevent any water from coming into the vehicle if the vehicle is travelling in water. The axles 21 of the wheels 14 are adapted to rotate in support members 7 which are suitably secure to the frame (not shown). Associated with belts 29 and 30 are tension means 37 and 38 so that the belts 29 and 30 stay in contact with their associated pulleys.

Figure 3:
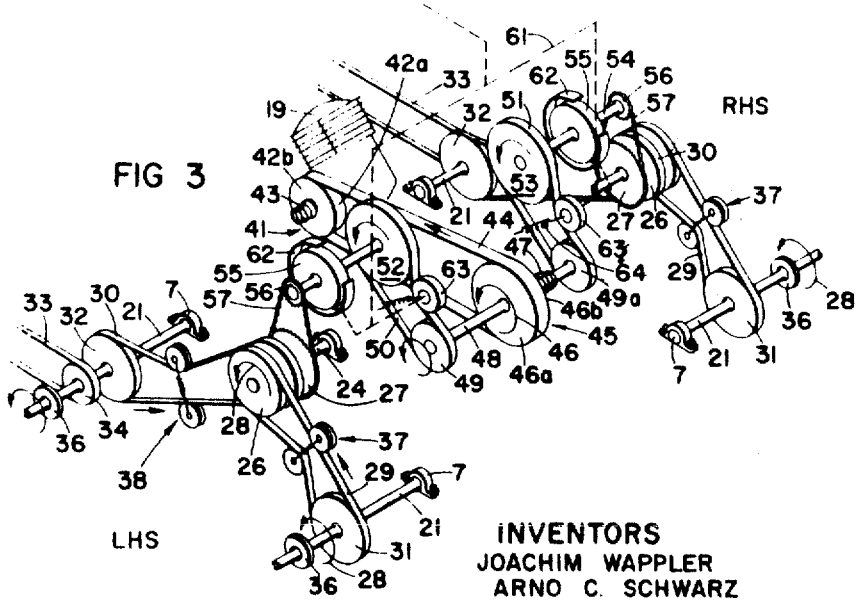
FIG. 3 is a perspective view of the schematic drawing showing the drive means and driving mechanism and how they are connected to the wheels of the vehicle.

FIG. 3 is a schematic view of the drive means 20 which drive the wheels 14. It is to be noted that the right-hand side is symmetrical to the left-hand side, however if an identical part is important for the description thereof a different number will be used instead of using the same number on both sides. The internal combustion engine 19 provides the power to drive the drive means 20 and is preferably a two stroke 197 CC. with a manual starter. Engine support members (not shown) are bolted to the bottom of the vehicle at one end thereof and the other end is fastened to a cross support member. An engine variable pulley 41 is secured to the output shaft of the engine 19. The engine variable pulley 41 comprises a fixed plate 42a and a movable plate 42b between the plates 42a and 42b is positioned a spring 43 which urges the movable plate 42b towards the fixed plate 42a when the engine 19 is speeded up. Belt 44 engages a main variable pulley 45 which travels in the direction shown by the arrow 46. The main variable pulley 45 is similar to the engine variable pulley 41 with a fixed plate 46a and a movable plate 46b with the spring 47 between them. The variable pulley 45 is secured onto a main shaft 48 which extends outwardly on either side of the main variable pulley 45 having secured thereto a first V-belt pulley 49 and a second V-belt pulley 49a at the ends remote from the main variable pulley 45. Belts 50 and 51 are provided on either side of the longitudinal axis 25, belt 50 engaging the first pulley 49 and a third pulley 52 and belt 51 engaging the second pulley 49a and a fourth pulley 53. The third and fourth pulleys 52 and 53 are axially secured on separate rotatable shafts 54 with a brakedrum 55 and a sprocket 56 axially secured on each shaft 54 also. A chain 57 extends between the sprockets 27 and 56 to give a desired transmission ratio. It will be understood that in this way the common drive train from the engine is thus divided and delivered by shaft 48 to separate drive trains at each side of the vehicle. In addition to delivering power, the two belt systems comprising belt 50 and pulleys 49 and 52 and belt 51 and pulleys 49a and 53, respectively, also function as clutch mechanisms for disconnecting the drive to one or the other side selectively. For this purpose belts 50 and 51 are deliberately made too long and are held in tension by separate, releaseable tension means described in detail below.

A braking and steering control system 61 is indicated schematically in FIG. 3 as a dotted line going from a control stick means (not shown) to both brake means 62 and belt tension release means 63.

Figures 4, 5:
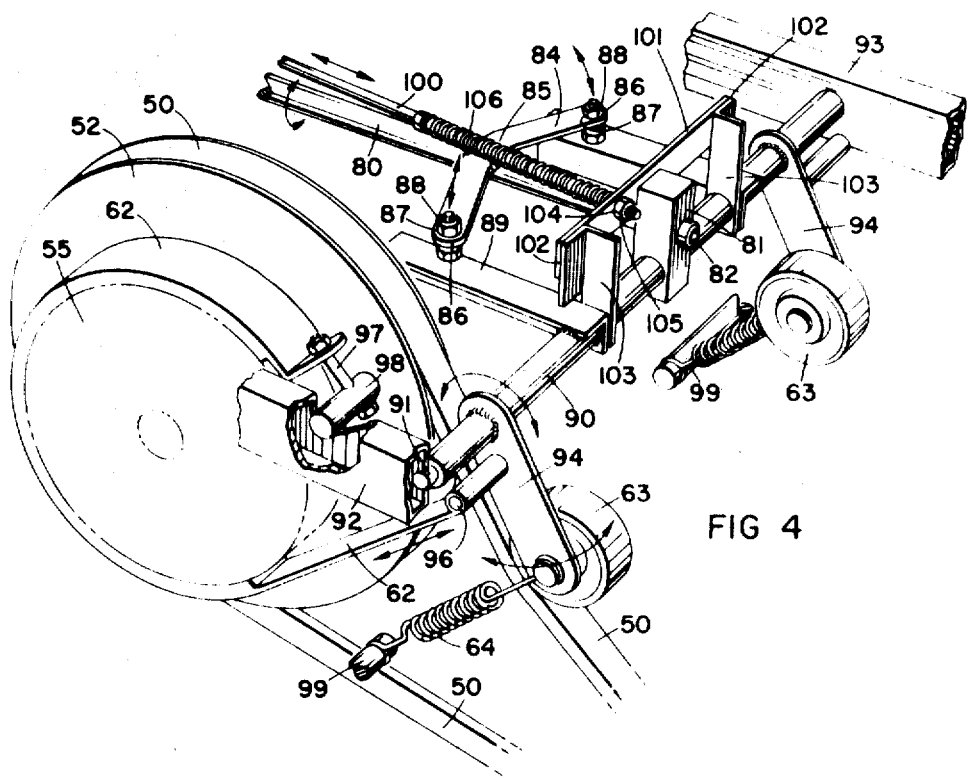
FIG. 4 is a perspective view of a steering and braking mechanism used in the vehicle.
FIG. 5 is an elevation view showing a brake drum and a brake band which is used in the drive means.
Figure 8:
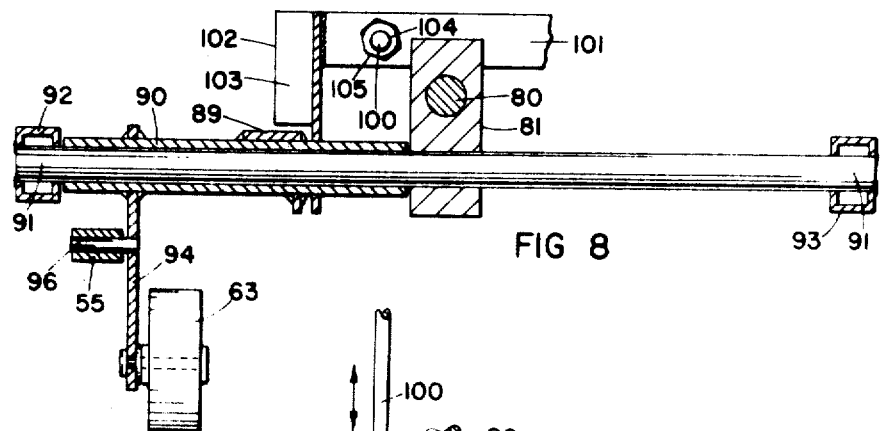
FIG. 8 shows a sectional view taken along the line 8—8 in FIG. 7.
Figure 7:
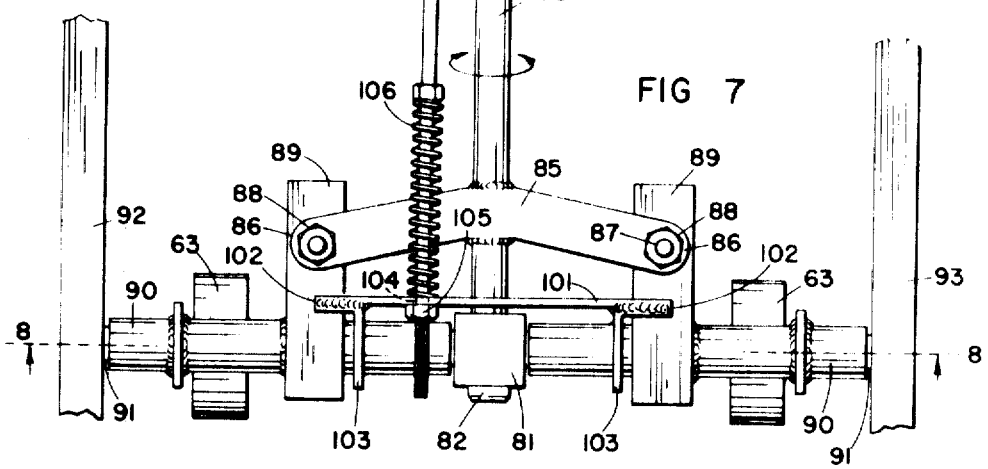
FIG. 7 is a plan view of the control system for the drive means of the vehicle.

With reference to FIGS. 4 and 5 it will be noted that the braking means comprises a band 62 fitting around the brake drum 55 and spaced apart therefrom and having one fixed end fastened by bolt 97 to frame member 98 and one movable end fastened to pin 96 on plate 94. The tensioning means 63 which arranged to release the tension in belts 50 or 51 simultaneously with the application of the band 62 to the drum 55 comprises a tension wheel 63 rotatably mounted on plate 94 whereby upon swinging of plate 94 upwardly the brake band 62 is applied and the tension is released, and upon swinging of the plate 94 downwardly the brake band 62 is released from the brakedrum 55 and belt 50 is tensioned once more.

FIG. 5 is an elevation view of the brake band 62 on the brakedrum 55 and the tension wheel 63 associated with the belt 50. When the apparatus is in the position shown in the solid outline the braking means is being applied and the tension wheel 63 is drawn away from the belt 50 and the spring means 64 is extended. The first pulley 49 is being rotated continuously in the direction of the arrow 46 while the belt 50 will slip on the third pulley 52 therefore not transmitting any power to the pulley 52. The brake band 62 is drawn into contact with the brakedrum 55 so as to prevent the brakedrums 55 and the shafts 54 from rotating.

When the apparatus is in the position shown in the dotted outline the brake band 62 is not engaging the brakedrum 55 as the spacing between the band 62 and drum 55 is maintained and the shafts 54 are permitted to rotate. Also, the tension wheel 63 is shown engaging the belt 50 and tightening the belt 50 on the pulleys 49 and 52 so that the pulley 52 and the shafts 54 will be rotated.

Preferably according to the invention the associated braking and belt-tensioning means on each side of the vehicle are operated either selectively or together in unison by a single-handle control system and for the sake of clarity the selective, i.e., steering control system will be described first.

Figure 6:
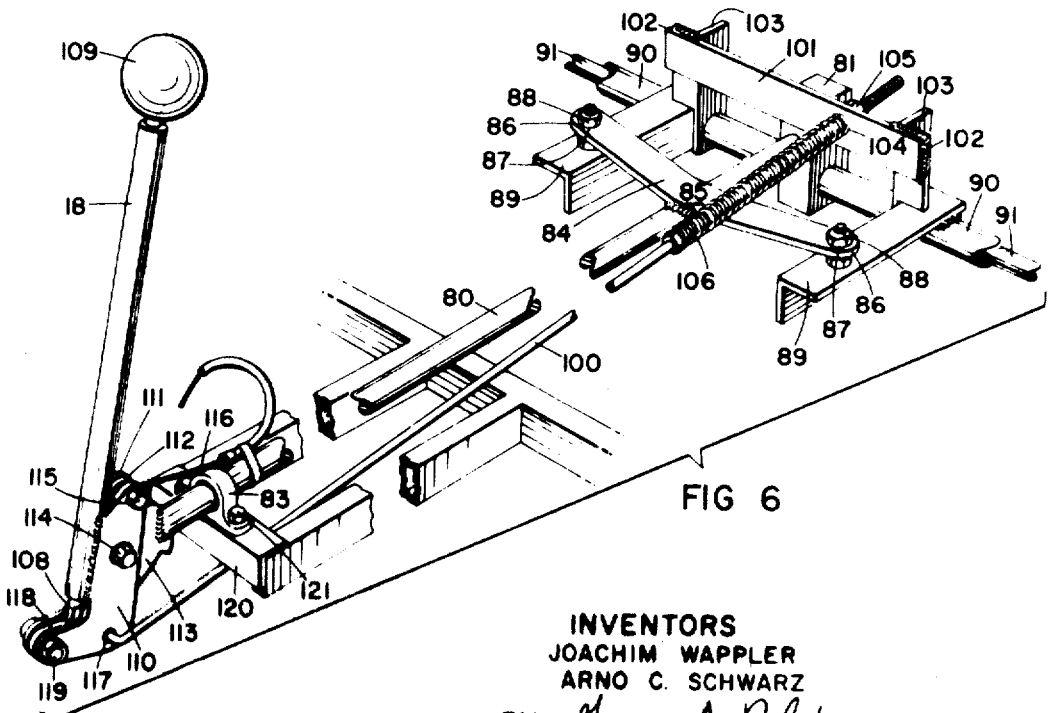
FIG. 6 is a perspective view showing a single control stick system connected to the steering and braking means used with the drive means.

FIGS. 4 and 6 illustrate the selective steering and braking control mechanism 61 which is preferably symmetrical about the longitudinal axis 25 also. A steering control rod 80 is connected between the stick control 18 (shown in FIG. 6) and a post 81 through which the rod 80 is past and secured on the other side thereof by a nut 82. The rod 80 is securely held in a bearing 83 connected to a frame member so that the rod 80 can rotate in a clockwise or counterclockwise direction only. At the end of the rod 80 remote from the control stick 18 connection is a yoke 84 which is preferably a flatplate with its center portion 85 welded to the rod 80. At the free ends 86 of the plate are holes 87 for a nut and bolt combination 88 to pass therethrough. The plate 84 is shaped to position the nut and bolt combination 88 over a horizontally placed angle iron 89 which is connected to the tension wheel 63 and associated brake band 62 the horizontal angle iron 89 is secured and positioned. Perpendicular to a sleeve 90 which is fitted upon a rod 91 which is securely held between frame members 92 and 93. A flat plate 94 is secured to the sleeve 90 so that when the angle iron 89 is moved in an up and down direction the flat plate 94 will rotate in a clockwise or counterclockwise direction about the rod 91. The tension wheel 63 is rotatably pinned to the flat plate 94 at an end remote from the sleeve 90 and has a spring means 64 which biases the wheel 63 towards the belt connected to a frame member 99. Extending outward from the flat plate 94 on the side opposite the wheel 63 is a pin 96 to which one end of the band 62 is permanently secured. The remainder of the band 62 passes around the brakedrum 55 and is connected by nut and bolt combination 97 to a pin 98 secured in the frame member 92.

To steer the vehicle to the left or to the right the steering control rod 80 is turned in the desired direction by moving the control stick 18 in that direction. This provides independent operation of either brake control system. The brake control system is operated from the horizontal angle iron 89 by means of the steering system alone. The yoke 84 welded to the steering rod 80 can operate either horizontal angle iron 89 separately. The horizontal angle iron 89 on the side of the vehicle to which it wishes to steer the vehicle is forced down by the nut and bolt combination 88 so that the tension wheel 63 is removed from the adjacent belt and the band 62 is put in contact with its associated brakedrum 55 to stop the wheel 14 on that side. The wheels 14 on the other side continue to drive the vehicle causing the vehicle to turn in the direction indicated by the control stick 18. As the speed of the vehicle increases the braking effort for steering should preferably become greater therefore making it more difficult to oversteer the vehicle at high speeds.

This is achieved by the fact that as the vehicle speed increase the control rod 18 will be moved further and further forward at an increasing angle, thus reducing the mechanical advantage of the overall system.

In order to apply both sets of brakes simultaneously, a separate brake control system is employed, operated by the same control stick 18. Thus a brake control rod 100 is connected between the control stick 18 and a flat plate 101 with its ends 102 welded to a vertical angle iron 103 positioned above the sleeves 90 on the rod 91. The brake control rod 100 passes through a hole 104 in the plate 101 and has a nut 105 screwed on the end thereof. A spring and nut combination 106 in front of the plate 101 returns the plate 101 to its normal position resting against the post 81.

Figure 11:
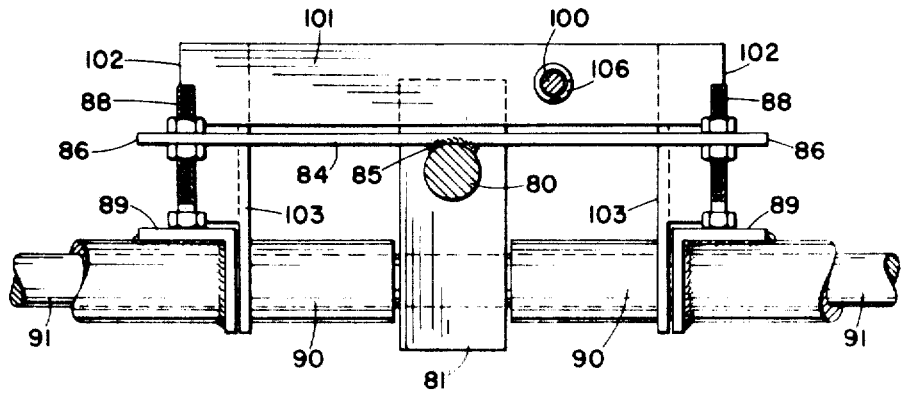
FIG. 9 to FIG. 11 illustrates the steering and braking mechanism in different positions of operation, such as full speed ahead in FIG. 11, braking in FIG. 10, and steering to the right in FIG. 9.

As the control stick 18 is pushed backwards to brake the vehicle the brake control rod 100 is pulled forward. The plate 101 is thus pushed forward by rod 100, as shown in FIG. 11 and the vertical angle irons 103 are drawn into contact with both horizontal angle irons 89 thereby rotating sleeves 90 and plates 94 and the tension wheels 63 are drawn away from the belts 50 and 51 while the brake bands 62 are brought into contact with the brakedrums 55 to stop rotation of the shafts 54.

Also in FIG. 6 is shown the control system which is preferably used with the braking and steering mechanism previously described. The control stick 18 is hollow with a rod 108 passing through it. A head piece 109 is secured at the upper end of the rod 108 for the operator to hold in his hand. The stick 18 is secured its lower end to a first and second spaced-apart L-shaped member 110 and 111 respectively, with a space 112 therebetween. A ratchet mechanism 113 is welded on the end of the steering rod 80 extending out past the bearing 83 and is inserted in he space 112. A nut and bolt combination 114 is passed through holes provided in the support members 110 and 111 also in the ratchet mechanism 113 to provide a pivot axis for the control stick. In the upper portions of the support members 110 and 111 are provided holes for a nut and bolt combination 115 to pass through to which an engine throttle cable 116 is connected.

The control stick 18 has two planes of motion. In the first plane of motion the stick 18 is swung forward and backwards, forward to extend the effective length of the throttle cable 116 which is connected to he throttle (not shown) of the engine 19 to accelerate the engine 19 and vehicle. Then backwards to brake the wheels of the vehicle. In the second plane of motion the stick 18 is swung laterally to operate the steering mechanism previously described.

In the lower portions of the support members 110 and 111 is provided a hole 117 to permit the braking rod 100 to be secured to the control stick 18. Also a movable arm 118 is pivoted by a nut and bolt combination 119 in the lower portion of the support members 110 and 111. The movable arm 118 operates with the ratchet mechanism 113 to permit locking the control stick 18 in a neutral position and in a braking position. The bearing 83 is connected to a frame member 120 by bolts 121 on each side to secure the steering rod 80 from a backward and forward motion.

Figure 9:
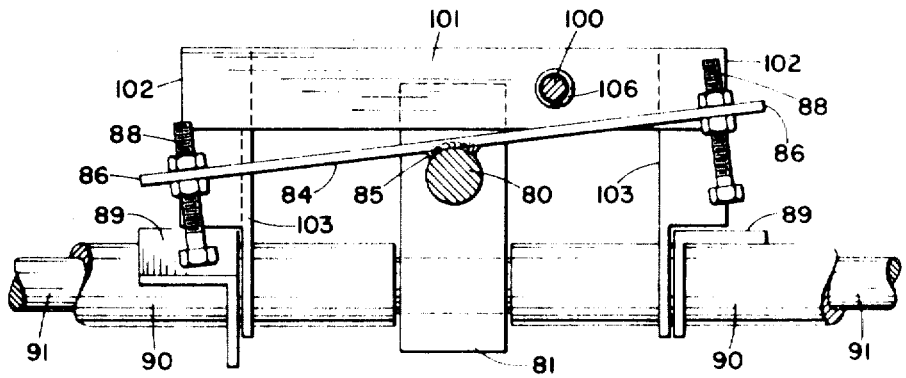

In operation, when the operator is steering the vehicle to the right he will swing the control stick 18 to the right operating the steering mechanism, as illustrated in FIG. 9, with the plate 84 tilted so that the nut and bolt combination 88 is contacting the horizontal angle iron 89 and applying the braking means to the wheels on the right-hand side of the vehicle while the braking means on the left-hand side are not applied.

Figure 10:
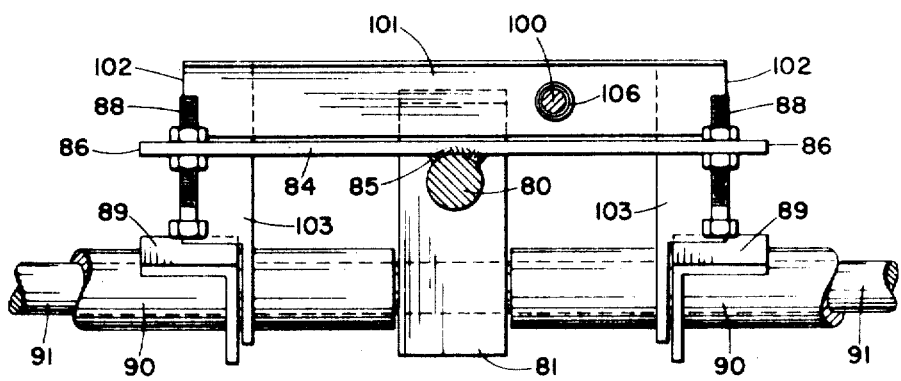

When the operator brakes the vehicle he pulls back the control stick 18 the brake control rod 100 is drawn forward, and as illustrated in FIG. 10, the braking means on both sides of the vehicle are applied in unison to stop the shafts 54 from rotating. The vertical angle irons 103 are drawn forward to engage the horizontal angle irons 89 while the nut and bolt combinations 88 do not make contact with the horizontal angle irons 89 the downward movement of the angle irons 89 causes the plates 94 to rotate drawing the tension wheels 63 away from the belts 50 and 51 so that the belts 50 and 51 will slip on the third and fourth pulleys 52 and 53. Also the bands 62 are drawn into contact with the drums 55 to stop the rotation of the shafts 54.

When the operator wishes to have the vehicle move forward he pushes the control stick 18 forward and as illustrated in FIG. 11 the braking mechanism is not applied while the engine drives the wheels. With no downward force on the angle irons 89 the plates 94 are free to rotate and the tension wheels 63 are drawn into contact with the belts 50 and 51 by the spring means 64 causing the belts to drive the third and fourth pulleys 52 and 53 and rotate the shafts 54. Also, the spacing between the bands 62 and the drums 55 are maintained so as not to prevent the shafts 54 from rotating.

Other variations of this invention are possible such as, changing the relative locations of the slipping belts and brakedrum. The brakedrum and bands could be positioned in the driving mechanism and not in the drive means as shown in he drawings. Also the belts 50 and 51 and pulleys 49 and 49a could be replaced by rubber drive wheels which are placed in direct contact with the pulleys 52 and 53 to drive those pulleys as in a record player drive system. When the brake system is applied the rubber drive wheels could be drawn out of contact with the associated pulleys as the tension wheels 63 are done now.

Other control systems could also be used with the invention in a motor-driven vehicle. The single control stick system could be replaced by other well-known equipment to operate the braking means on either side of the vehicle selectively. Also the steering mechanism could be operated on either side of the vehicle by separate steering levers and there could possibly be separate acceleration and braking pedals for the use of the operator of the vehicle.

In this invention the drive means 20 could be considered to be a selective vehicle wheel speed control system having a separate side drive train system carrying power from the motor 19 to the wheel 14. The slipping belts 50 and 51 could be considered to be frictional drive transmission means which are selectively engaged and disengaged by the tension wheels 63. For the purpose of this specification, the term "frictional drive" is therefore to be deemed to exclude fixed drive means such as toothed or notched belts or chains or the like in which such fixed drive means are operated in fixed positional relation to another drive member such as a sprocket or the like. The first and second pulleys 49 and 49a are used as drive members whereas the third and fourth pulleys 52 and 53 axially secured to the shaft 54 are the driven members. Frictional belts are preferably used between associated pulleys rather than toothed belts which must be used with pulleys in a fixed positional relationship to one another.

The foregoing is a description of a preferred embodiment of the invention which is here made by way of example only.

We claim:

1. A selective vehicle wheel speed control system for use in association with a vehicle having wheels rotatably associated therewith on each side thereof, motor means for driving said vehicle, and separate side drive train systems driven by said motor means and transmitting power from said motor means to at least one driven wheel on each side of said vehicle respectively said vehicle being adapted to be steered at least in part by selective braking of at least one of said driven wheels and stopped by simultaneous braking of both and comprising;

a drive member adapted to be operatively connected to said motor means and a driven member adapted to be operatively connected to a said driven wheel, incorporated in each said side drive train system;

constant ratio frictional drive transmission means incorporated in each said side drive train system and operatively connecting said drive member and said driven member;

separate drive disengaging means in respective said side drive train systems for selectively releasing either one of said drive transmission means from a said member at least;

separate braking means connected with respective said side drive train systems for braking said wheels driven by said respective driven member;

means interconnecting said drive disengaging means and its respective braking means in respective said side drive train systems for simultaneous operation of said braking means with said releasing of the respective drive transmission means;

Joint brake operating means connected both to said disengaging means and to said braking means for simultaneous operation of both braking means and both disengaging means for stopping, and braking with said drive disengaged, and, selective brake-operating means connectable with one or other of said disengaging means and respective braking means in a said side drive train system for selective drive disengagement and braking of its respective said driven member.

2. The speed control system, as described in claim 1, wherein said frictional drive transmission means comprise a belt.

3. The speed control system, as described in claim 1, including an operator steering and braking control system mounted in said vehicle and operatively connected to said selective break-operating means and to said joint brake-operating means whereby an operator may operate either said braking means selectively for steering or jointly for braking said vehicle simultaneously with engagement and disengagement of respective drive transmission means.

4. The speed control system, as described in claim 3 including joint brake operating connection means adapted to be connected to both braking means and operatively connected to said operator control system.

5. The speed control system, as described in claim 3, including separate brake operating connection means adapted to be connected to both braking means and operating connected to said operator control system whereby an operator may operate either separate braking means selectively for steering.

6. The speed control system, as described in claim 1, including a single control stick pivotally mounted in said vehicle for movement in two planes at right angles and operatively connected to said selective brake-operating means and to said joint brake-operating means whereby an operator may operate either said braking means selectively for steering by movement of said stick in one said plane or jointly for braking said vehicle by movement thereof in the other said plane simultaneously with engagement and disengagement of respective belt drive transmission means.

7. The speed control system, as described in claim 1, wherein said separate braking system comprises:

a brake drum operatively associated with said respective side drive train; and a brake band extending at least part way around said brake drum cooperating with said brake drum and connected to its respective brake operating means to be drawn into contact with said brake drum.

8. The speed control system, as described in claim 1, wherein said selectively engaging and disengaging means comprises:

a tension wheel movably engaging said frictional drive transmission means;

return spring means operatively connected to said tension wheel to draw said tension wheel into engagement with said frictional drive transmission means; and selectively engaging and disengaging connection means connected to said tension wheel and operatively connected to said braking means and adapted to provide engagement and disengagement of respective drive transmission means simultaneously with acceleration and braking of said vehicle.